US009089766B2

(12) United States Patent
Osada

(10) Patent No.: US 9,089,766 B2
(45) Date of Patent: Jul. 28, 2015

(54) GAME SYSTEM, GAME APPARATUS, NON-TRANSITORY COMPUTER-READABLE STORAGE MEDIUM HAVING GAME PROGRAM STORED THEREON, AND GAME PROCESSING CONTROL METHOD

(71) Applicant: NINTENDO CO., LTD., Kyoto (JP)

(72) Inventor: Junya Osada, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 114 days.

(21) Appl. No.: 13/867,408

(22) Filed: Apr. 22, 2013

(65) Prior Publication Data

US 2014/0080594 A1 Mar. 20, 2014

(30) Foreign Application Priority Data

Sep. 19, 2012 (JP) ................................ 2012-206142

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***A63F 13/98*** | (2014.01) |
| ***A63F 13/90*** | (2014.01) |
| ***A63F 13/40*** | (2014.01) |

(52) U.S. Cl.

CPC ................ *A63F 13/00* (2013.01); *A63F 13/02* (2013.01); *A63F 13/08* (2013.01); *A63F 13/10* (2013.01); *A63F 2300/301* (2013.01); *A63F 2300/6081* (2013.01)

(58) Field of Classification Search

CPC ............... A63F 2009/2438; A63F 2009/2457; A63F 2009/247; A63F 2009/2485; A63F 2009/2488; A63F 13/23; A63F 13/235; A63F 13/25; A63F 13/26; A63F 13/285; A63F 13/525; A63F 13/5252; A63F 13/5255; A63F 13/5258

USPC .......................................................... 463/42

See application file for complete search history.

(56) References Cited

U.S. PATENT DOCUMENTS

2012/0165095 A1 6/2012 Sato et al.

FOREIGN PATENT DOCUMENTS

JP 2012-135337 7/2012

*Primary Examiner* — Kevin Y Kim

(74) *Attorney, Agent, or Firm* — Nixon & Vanderhye, P.C.

(57) ABSTRACT

A game apparatus generates, based on the same sound data, a first sound signal to be output to a first sound output section, and a second sound signal to be output to a second sound output section which is physically different from the first sound output section. The generated second sound signal is a sound signal to which a predetermined acoustic effect is not added, and the first sound signal is a sound signal in which an acoustic effect is added to at least a part of sounds included in the second sound signal.

10 Claims, 8 Drawing Sheets

2
2a
SOUND EFFECT
(WET COMPONENT)
2a
6
23
23
ORIGINAL SOUND
(DRY COMPONENT)

F I G. 2
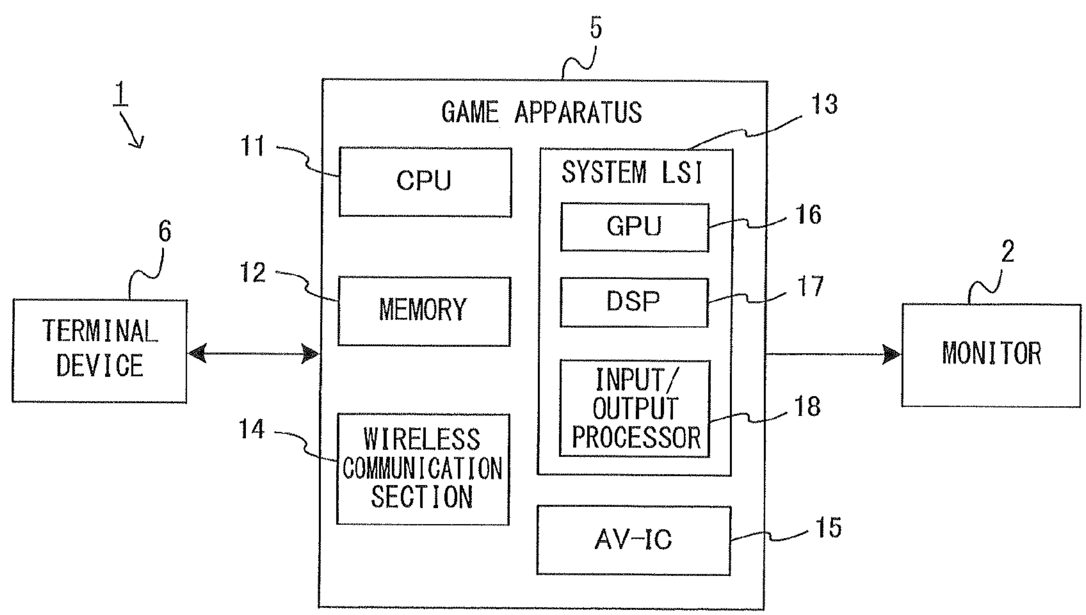

F I G. 5
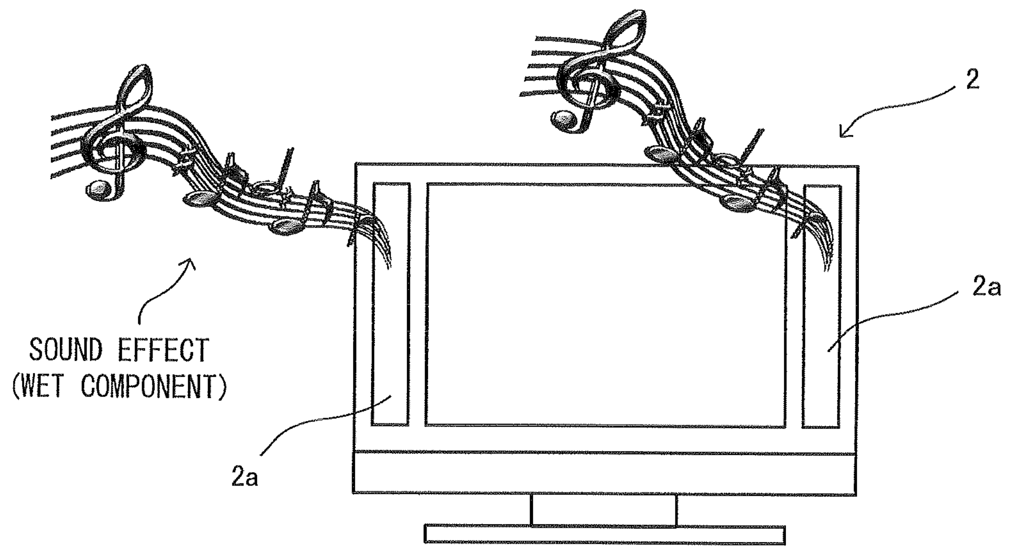
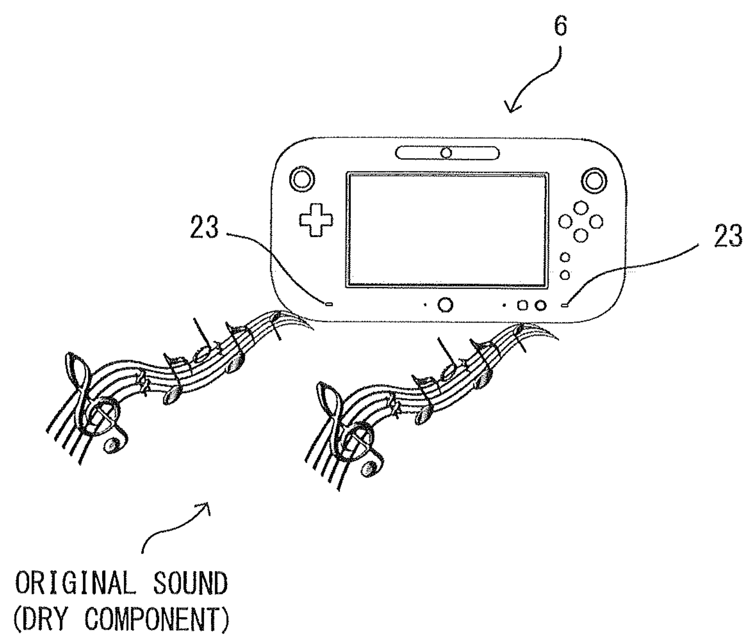

F I G. 8
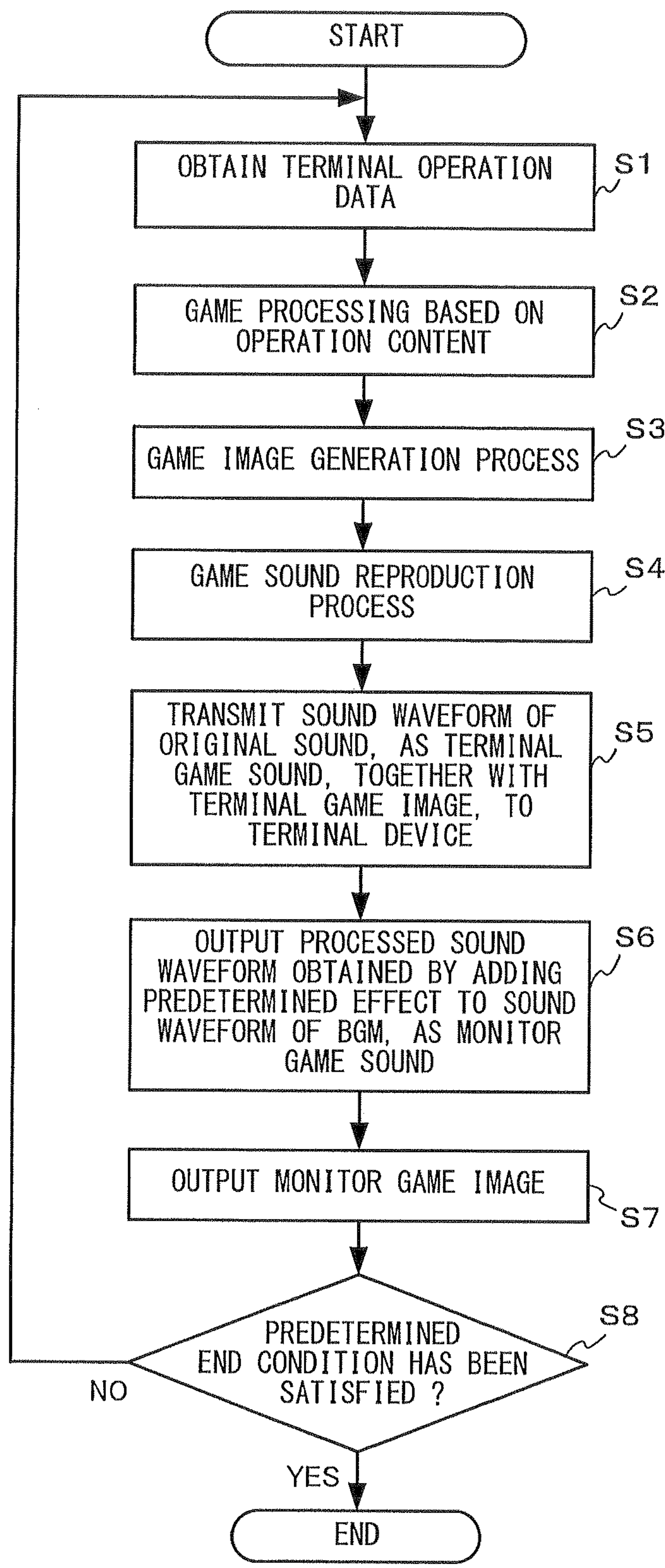

GAME SYSTEM, GAME APPARATUS, NON-TRANSITORY COMPUTER-READABLE STORAGE MEDIUM HAVING GAME PROGRAM STORED THEREON, AND GAME PROCESSING CONTROL METHOD

CROSS REFERENCE TO RELATED APPLICATION

The disclosure of Japanese Patent Application No. 2012-206142, filed on Sep. 19, 2012, is incorporated herein by reference.

FIELD

The exemplary embodiments relate to a game system, a game apparatus, a non-transitory computer-readable storage medium having a game program stored thereon, and a game processing control method, and more particularly, to those using a plurality of different sound output devices.

BACKGROUND AND SUMMARY

Conventionally, a game system has been known in which a general television device (first video output device) and a controller (second video output device) including a display section capable of video output, which is different from the first video output device, are used in combination. In such a game system, for example, a first game video is displayed on the television device, and a second game video different from the first game video is displayed on the display section of the controller, thereby proposing a new game.

However, the above-mentioned proposal has focused mainly on what kinds of videos are to be displayed and how to display the videos in relation to game processing. Therefore, processing relating to audio has been neither described nor proposed in particular.

Therefore, an object of the exemplary embodiments is to provide a game system, a game apparatus, a non-transitory computer-readable storage medium having a game program stored thereon, and a game processing control method, which are capable of providing a player with a new game using sound output devices that are physically different from each other. It is noted that examples of the computer-readable storage medium include magnetic media such as a flash memory, a ROM, and a RAM, and optical media such as a CD-ROM, a DVD-ROM, and a DVD-RAM.

The above object is achieved by the following configurations, for example.

An exemplary configuration is a game system including a game apparatus, a first output device having a first display section and a first sound output section, and a second output device having a second display section and a second sound output section. The game apparatus includes an image generation section and a sound generation section. The image generation section generates a first image to be displayed on the first display section, and a second image to be displayed on the second display section. The sound generation section generates, based on the same sound data, a first sound signal to be output to the first sound output section, and a second sound signal to be output to the second sound output section. The sound generation section generates, as the second sound signal, a sound signal to which no predetermined acoustic effect is added, and generates the first sound signal so as to include a sound signal which is obtained by adding a predetermined acoustic effect to at least a part of the sound of the second sound signal.

According to the above exemplary configuration, for example, when reproducing a music, a sound to which an effect such as a reverb is added is output from the first sound output device, while an original sound to which no effect is added is output from the second sound output device. Thus, it is possible to provide a player with a game in which the player can realistically feel a sense of space caused by the sounds.

In another exemplary configuration, the sound generation section may generate the first sound signal so as to include a sound to which a reverberation effect is added as the acoustic effect.

In still another exemplary configuration, the image generation section may generate, as the first image, an image of a virtual space based on a first virtual camera, and generates, as the second image, an image of the virtual space based on a second virtual camera.

In still another exemplary configuration, the second output device may further include an operation data generation section configured to generate operation data based on an operation performed by a player. The game apparatus may further include a game processing section configured to perform a game process based on the operation data.

In still another exemplary configuration, the first output device may be a monitor device which includes or is connectable to predetermined loudspeakers as the first sound section, and a sound based on the first sound signal may be output from the loudspeakers which are included in or connected to the monitor device. The monitor device may be a general (tuner-built-in) television, or a monitor having no built-in tuner (e.g., a monitor for a personal computer).

In still another exemplary embodiment, the sound generation section may change the intensity of the acoustic effect in accordance with a distance from a sound source object in a virtual game space, which is defined as a source of the sound based on the first sound signal and the second sound signal, to a predetermined object or a virtual camera in the virtual game space.

In still another exemplary embodiment, the sound generation section may generate the first sound signal such that the shorter the distance from the sound source object is, the smaller the acoustic effect is.

According to the exemplary embodiments, it is possible to provide a game and the like using an acoustic effect that causes a player to realistically feel a sense of space caused by sounds, and thus it is possible to provide the player with an unprecedented user experience.

BRIEF DESCRIPTION OF THE DRAWINGS

FIG. 2 is a functional block diagram showing a non-limiting example of a game apparatus body 5 in FIG. 1;

FIG. 5 is a diagram showing a non-limiting example of an output state of a game sound;

FIG. 8 is a flowchart showing a flow of game processing based on game processing program 81.

DETAILED DESCRIPTION OF NON-LIMITING EXAMPLE EMBODIMENTS

Figure 1:
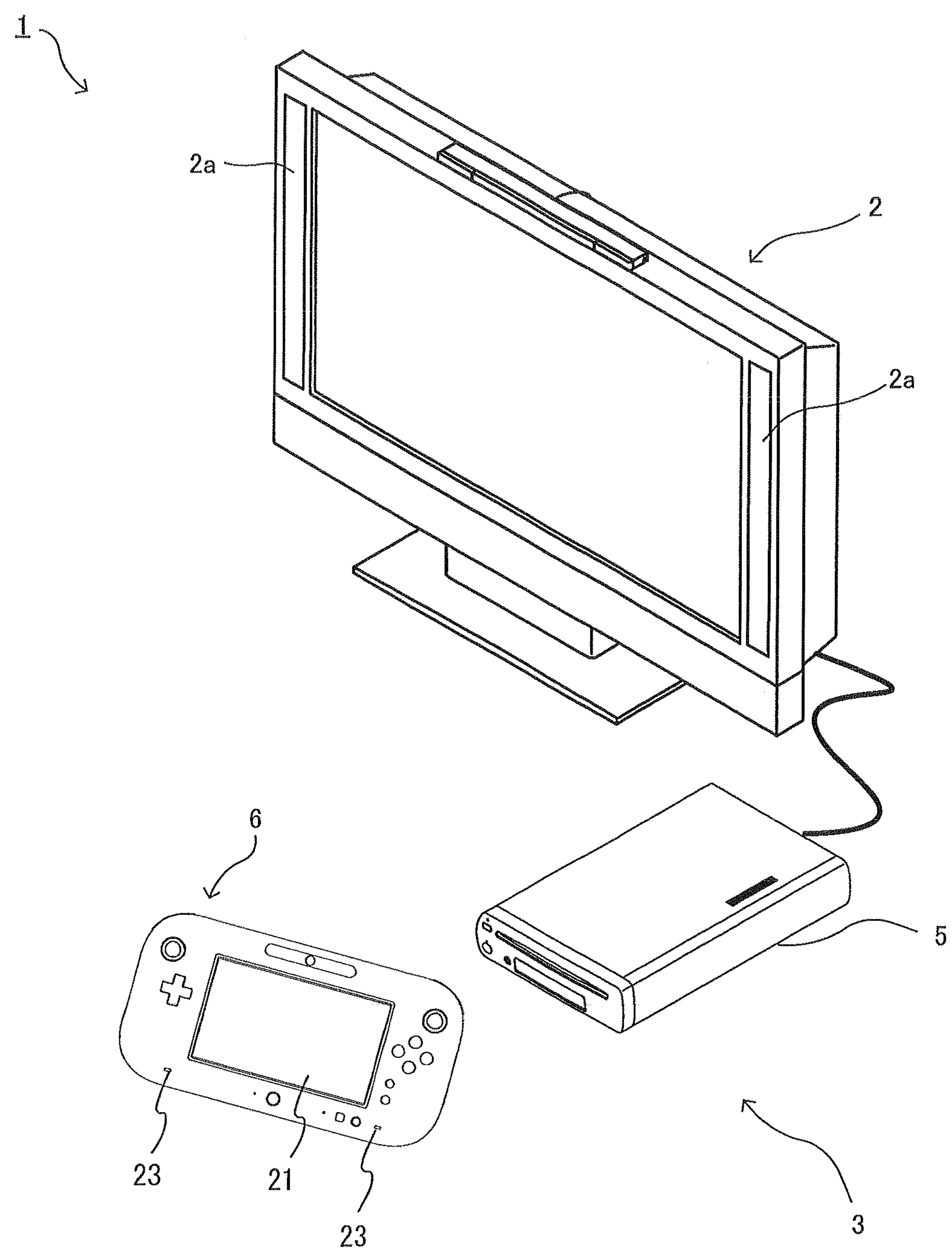
FIG. 1 is an external view showing a non-limiting example of a game system 1 according to an embodiment.

With reference to FIG. 1, a game system according to an exemplary embodiment will be described.

As shown in FIG. 1, a game system 1 includes a household television receiver (hereinafter, referred to as a monitor) 2 that is an example of display means, and a stationary game apparatus 3 connected to the monitor 2 via a connection cord. The monitor 2 includes loudspeakers 2*a*. The game apparatus 3 includes a game apparatus body 5, and a terminal device 6.

The monitor 2 displays a game image outputted from the game apparatus body 5. The monitor 2 includes the loudspeakers 2*a*, and the loudspeakers 2*a* each output a game sound outputted from the game apparatus body 5. In this exemplary embodiment, the monitor 2 includes the loudspeakers 2*a*. In another exemplary embodiment, external loudspeakers may be additionally connected to the monitor 2 (via an amplifier or the like).

The game apparatus body 5 executes game processing and the like based on a game program or the like stored in an optical disc that is readable by the game apparatus body 5.

The terminal device 6 is an input device that is small enough to be held by a user. The user is allowed to move the terminal device 6 with hands, or place the terminal device 6 at any location. The terminal device 6 includes an LCD (Liquid Crystal Display) 21 as display means, loudspeakers 23, a headphone jack described later, input means (analog sticks, press-type buttons, a touch panel, and the like), and the like. The terminal device 6 and the game apparatus body 5 are communicable with each other wirelessly (or via a cable). The terminal device 6 receives, from the game apparatus body 5, data of an image (e.g., a game image) generated in the game apparatus body 5, and displays the image represented by the data on the LCD 21. Further, the terminal device 6 receives, from the game apparatus body 5, data of a sound (e.g., a sound effect, BGM or the like of a game) generated in the game apparatus body 5, and outputs the sound represented by the data from the loudspeakers 23. Further, the terminal device 6 transmits, to the game apparatus body 5, operation data representing the content of an operation performed on the terminal device 6.

FIG. 2 is a block diagram showing the game apparatus body 5. In FIG. 2, the game apparatus body 5 is an example of an information processing apparatus. In the exemplary embodiment, the game apparatus body 5 includes a CPU (control section) 11, a memory 12, a system LSI 13, a wireless communication section 14, and an AV-IC (Audio Video-Integrated Circuit) 15, and the like.

The CPU 11 executes a predetermined information processing program by using the memory 12, the system LSI 13, and the like. Thereby, various functions (e.g., game processing) in the game apparatus 3 are realized.

The system LSI 13 includes a GPU (Graphics Processor Unit) 16, a DSP (Digital Signal Processor) 17, an input/output processor 18, and the like.

The GPU 16 generates an image in accordance with a graphics command (draw command) from the CPU 11. In the exemplary embodiment, the game apparatus body 5 may generate both a game image to be displayed on the monitor 2 and a game image to be displayed on the terminal device 6. Hereinafter, the game image to be displayed on the monitor 2 may be referred to as a “monitor game image”, and the game image to be displayed on the terminal device 6 may be referred to as a “terminal game image”.

The DSP 17 serves as an audio processor, and generates sound data by using sound data and sound waveform (tone quality) data stored in the memory 12. In the exemplary embodiment, similarly to the game images, both a game sound to be output from the loudspeakers 2*a* of the monitor 2 and a game sound to be output from the loudspeakers 23 of the terminal device 6 may be generated. Hereinafter, the game sound to be output from the monitor 2 may be referred to as a “monitor game sound”, and the game sound to be output from the terminal device 6 may be referred to as a “terminal game sound”.

The input/output processor 18 executes transmission and reception of data with the terminal device 6 via the wireless communication section 14. In the exemplary embodiment, the input/output processor 18 transmits data of the game image (terminal game image) generated by the GPU 16 and data of the game sound (terminal game sound) generated by the DSP 17, via the wireless communication section 14 to the terminal device 6. At this time, the terminal game image may be compressed and transmitted so as to avoid a delay in the display image. In addition, the input/output processor 18 receives, via the wireless communication section 14, operation data and the like transmitted from the terminal device 6, and (temporarily) stores the data in a buffer region of the memory 12.

Of the images and sounds generated in the game apparatus body 5, the image data and sound data to be output to the monitor 2 are read by the AV-IC 15. Through an AV connector that is not shown, the AV-IC 15 outputs the read image data to the monitor 2, and outputs the read sound data to the loudspeakers 2*a* included in the monitor 2. Thereby, an image is displayed on the monitor 2, and a sound is output from the loudspeakers 2*a*.

Figure 3:
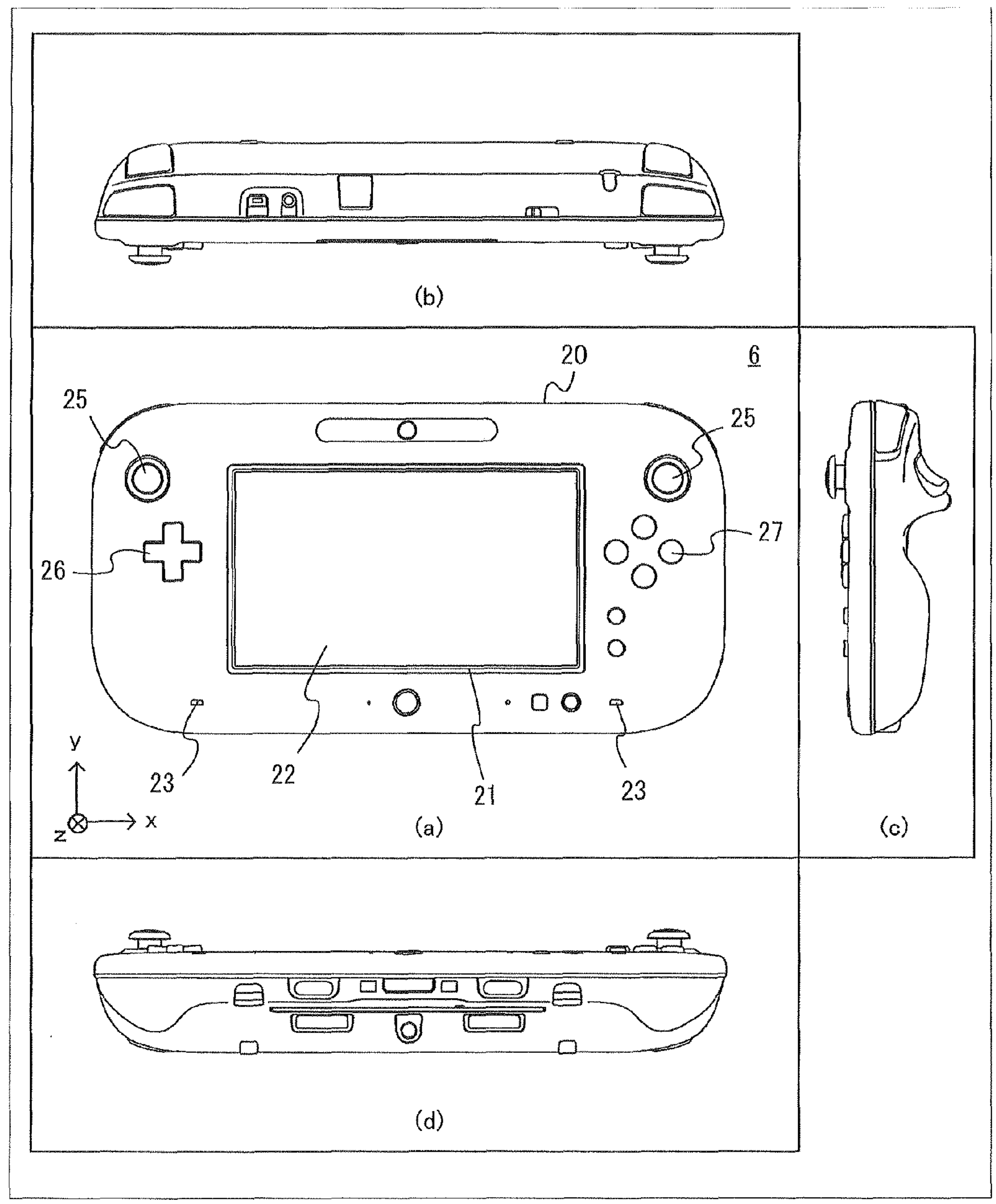
FIG. 3 is a diagram showing a non-limiting example of an external structure of a terminal device 6 in FIG. 1.

FIG. 3 is a diagram showing an example of an external structure of the terminal device 6. As shown in FIG. 3, the terminal device 6 includes a substantially plate-shaped housing 20. The size (shape) of the housing 20 is small enough to be held by a user with both hands or one hand. Further, the terminal device 6 includes an LCD 21 as an example of a display section. The above-mentioned terminal game image is displayed on the LCD 21.

The terminal device 6 includes the loudspeakers 23. The above-mentioned terminal game sound is output from the loudspeakers 23.

The terminal device 6 includes a touch panel 22. The touch panel 22 is an example of a position detection section for detecting a position of an input performed on a predetermined input surface (a screen of the display section) provided on the housing 20. Further, the terminal device 6 includes, as an operation section (an operation section 31 shown in FIG. 4), analog sticks 25, a cross key 26, buttons 27, and the like.

Figure 4:
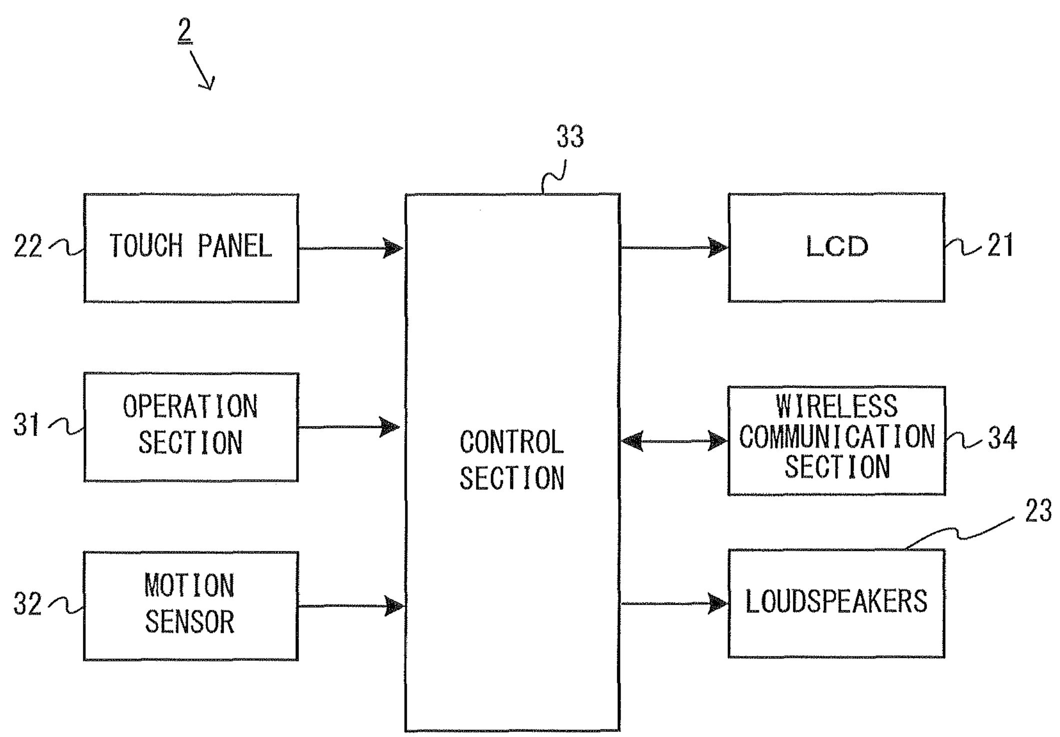
FIG. 4 is a block diagram showing a non-limiting example of an internal structure of the terminal device 6.

FIG. 4 is a block diagram showing an electrical configuration of the terminal device 6. As shown in FIG. 4, the terminal device 6 includes the above-mentioned LCD 21, touch panel 22, loudspeakers 23, and operation section 31. Further, the terminal device 6 includes a motion sensor 32 (e.g., an acceleration sensor or a gyro sensor) for detecting the attitude of the terminal device 6.

The terminal device 6 includes a wireless communication section 34 capable of wirelessly communicating with the game apparatus body 5. In the exemplary embodiment, wireless communication is performed between the terminal device 6 and the game apparatus body 5. In another exemplary embodiment, wired communication may be performed.

The terminal device 6 includes a control section 33 for controlling operations in the terminal device 6. Specifically, the control section 33 receives output data from the respective input sections (the touch panel 22, the operation section 31, and the motion sensor 32), and transmits the received data, as operation data, via the wireless communication section 34 to the game apparatus body 5. When the terminal game image from the game apparatus body 5 is received by the wireless communication section 34, the control section 33 performs, according to need, appropriate processes (e.g., decompression if the image data is compressed), and causes the LCD 21 to display the image from the game apparatus body 5. Further, when the terminal game sound from the game apparatus body 5 is received by the wireless communication section 34, the control section 33 outputs the terminal game sound to the loudspeakers 23.

Next, an overview of processing executed in the system of the exemplary embodiment will be described with reference to FIG. 5.

In the exemplary embodiment, a case where predetermined game processing is executed is assumed. In this game, predetermined BGM and/or sound effects are reproduced as game sounds. When reproducing such a BGM, a predetermined effect is often added to (the sound waveform of) the original sound of the BGM. For example, the following process has generally been executed. That is, a reverberation effect such as a reverb or delay is added to the original sound to generate a processed sound waveform, and the sound waveform of the original sound (sometimes referred to as a dry component) and the processed sound waveform (sometimes referred to as a wet component) are mixed with each other, and then the mixed sound is output from the loudspeakers 2*a* of the monitor 2 or the loudspeakers 23 of the terminal device 6.

By the way, the system of the exemplary embodiment includes, as devices that output sounds, the loudspeakers 2*a* of the monitor 2 and the loudspeakers 23 of the terminal device 6. So, the exemplary embodiment adopts a configuration in which, as shown in FIG. 5, the above-mentioned original sound (dry component) is output from the loudspeakers 23 of the terminal device 6, and the above-mentioned processed sound (wet component) is output from the loudspeakers 2*a* of the monitor 2. Thereby, the original sound outputted from the loudspeakers 23 and the processed sound outputted from the loudspeakers 2*a* are mixed with each other in the real space, and the mixed sound reaches the ears of the player. As a result, as compared to the case where the sound in which the original sound and the processed sound have been mixed is output from the loudspeakers 2*a* or 23, spatial expression is achieved by the more expansive sound, thereby providing the player with an unprecedented acoustic effect, which makes the player enjoy the game processing and the like.

The configuration of the exemplary embodiment is also useful in the following respect. For example, a case is assumed in which an original sound of a BGM is output from the loudspeakers 2*a* of the monitor 2 and the loudspeakers 23 of the terminal device 6 at the same time. In this case, depending on the performance of the monitor 2, a delay of video/audio output may occur in the monitor 2, which may cause a time lag between the sound output from the monitor 2 and the sound output from the terminal device 6. For example, in the case where the monitor 2 has a function of processing and/or amending an image and a sound outputted from the game apparatus body 5, when such a process is performed on the monitor side, there is a possibility that the BGM is output from the loudspeakers 2*a* of the monitor 2 after a little delay from the output of the BGM from the loudspeakers 23 of the terminal device 6. As a result, the player may feel uncomfortable in hearing the BGM. However, by adopting the above-mentioned configuration in which the sound to which the reverberation effect is added is output from the loudspeakers 2*a* of the monitor 2, even if such a delay occurs, the player is less likely to feel uncomfortable about the BGM. In addition, from the player, the loudspeakers 2*a* of the monitor 2 are farther than the terminal device (in the player's hands). Therefore, even if the sound to which the reverberation effect is added is output from the loudspeakers 2*a* of the monitor 2 with a little delay, the player rather takes the delay as a natural way of hearing.

Next, an operation of the system 1 to realize the above-mentioned game processing will be described in detail with reference to FIGS. 6 to 9.

Figure 6:
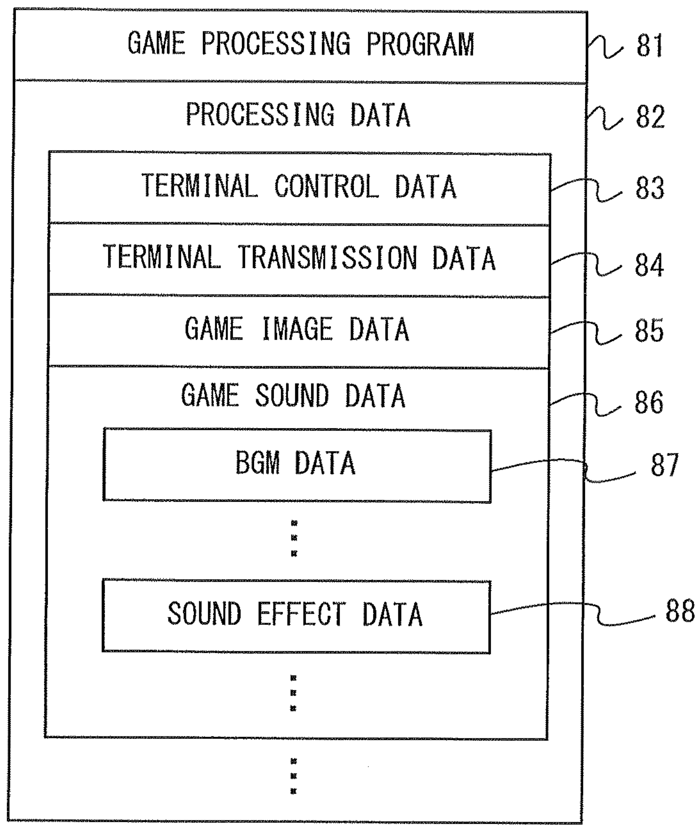
FIG. 6 is a memory map of a memory 12.

FIG. 6 shows an example of various data stored in the memory 12 of the game apparatus body 5 when executing the above-mentioned game processing.

A game processing program 81 is a program for causing the CPU 11 of the game apparatus body 5 to execute the game processing to realize the above-mentioned game. For example, the game processing program 81 is loaded from an optical disc to the memory 12.

Processing data 82 is data used for the game processing executed by the CPU 11. The processing data 82 includes terminal operation data 83, terminal transmission data 84, game image data 85, game sound data 86, and the like.

Figure 7:
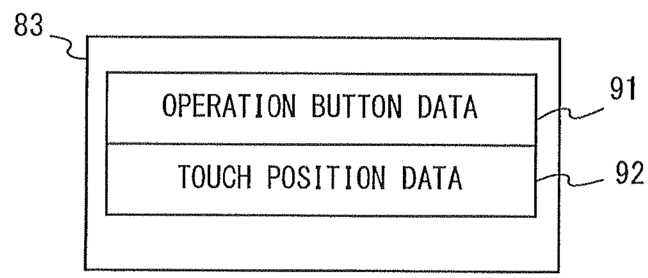
FIG. 7 is a non-limiting example of a structure of terminal operation data 83.

The terminal operation data 83 is operation data periodically transmitted from the terminal device 6. FIG. 7 is a diagram showing an example of a structure of the terminal operation data 83. The terminal operation data 83 includes operation button data 91, touch position data 92, and the like. The operation button data 91 is data representing an input state to the operation section 31 (the analog sticks 25, the cross key 26, and the buttons 27). In addition, the operation button data 91 also includes the content of an input to the motion sensor 32. The touch position data 92 is data representing a position (touch position) where an input is performed on the input surface of the touch panel 22.

The terminal transmission data 84 is data periodically transmitted to the terminal device 6. The terminal transmission data 84 includes the above-mentioned terminal game image and terminal game sound.

The game image data 85 is data which is an origin of the terminal game image and the monitor game image. For example, the game image data 85 includes data of various 3D objects that appear in the virtual game space, and the like.

The game sound data 86 is data which is an origin of the terminal game sound and the monitor game sound. The game sound data 86 includes at least one piece of BGM data 87 and at least one piece of sound effect data 88. The BGM data 87 and the sound effect data 88 each may be, for example, an audio file of WAV or MP3 format. Alternatively, the BGM data 87 and the sound effect data 88 each may be, for example, music score data that can be played by a sound source included in the game apparatus body 5.

Next, an exemplary flow of the game processing performed by the CPU 11 of the game apparatus body 5 based on the game processing program 81 will be described with reference to the flowchart of FIG. 8.

When execution of the game processing program 81 is started, a predetermined initialization process is performed. Thereafter, the CPU 11 obtains the terminal operation data 83 in step S1 in FIG. 8.

Next, in step S2, the CPU 11 executes predetermined game processes based on the operation content represented by the terminal operation data 83 (mainly, the operation content represented by the operation button data 91 and/or the touch position data 92). For example, the CPU 11 executes a process of moving various characters and objects such as a player character, a hitting determination process, a score addition process, and the like.

Next, in step S3, the CPU 11 executes a process of generating a game image in which the results of the above-mentioned game processes are reflected. For example, a game image is generated by taking, using a virtual camera, the virtual game space in which the user character has been moved based on the operation content. At this time, the CPU 11 appropriately generates both a monitor game image and a terminal game image in accordance with the game content. Specifically, the two images are generated by using two virtual cameras, respectively.

Next, in step S4, the CPU 11 executes a process of reproducing the game sound. That is, the CPU 11 appropriately reads the BGM data 87 and the sound effect data 88 from the memory 12 in accordance with the content of the game processing (game progression or the like), and reproduces the data. The reproduced sound (sound waveform) is the above-mentioned "original sound".

Next, in step S5, (data representing) the sound waveform of the original sound is stored as the terminal game sound in the terminal transmission data 84. In addition, the terminal game image generated in step S3 is also stored in the terminal transmission data 84. Then, the CPU 11 transmits the terminal transmission data 84 to the terminal device 6. Thereby, the terminal game sound as the original sound is transmitted to the terminal device 6, and (the sound signal representing) the original sound is output from the loudspeakers 23 of the terminal device 6.

Next, in step S6, the CPU 11 outputs, as the monitor game sound, (the sound signal representing) the processed sound waveform which has been obtained by adding a predetermined effect such as a reverb or delay to the sound waveform of the original sound, to (the loudspeakers 2*a* of) the monitor 2. Thereby, the game sound to which the effect is added is output from the loudspeakers 2*a* of the monitor 2. In the exemplary embodiment, the processed sound waveform is output without being mixed with the original sound. However, in another exemplary embodiment, the processed sound waveform mixed with the original sound may be output.

When adding the effect to the BGM or the like as the monitor game sound, the intensity of the effect may be controlled. For example, assuming that, in a virtual space, there is an object that outputs a predetermined BGM as described above (a speaker object, an instrument object, a character of a singer, or the like in the virtual space; hereinafter referred to as a sound source object), the intensity of the effect may be varied in accordance with the distance from the sound source object to the virtual camera or the player character. For example, the intensity of the effect may be reduced with the decreasing distance between the player character and the sound source object. In addition, the intensity of the effect may be increased with the increasing distance between the player character and the sound source object. Of course, the intensity of the effect may be constant regardless of the distance.

Next, in step S7, the CPU 11 outputs the monitor game image generated in step S3 to the monitor 2.

Next, in step S8, the CPU 11 determines whether or not a predetermined condition to end the game processing has been satisfied. Upon determining that the condition has not been satisfied (NO in step S8), the CPU 11 returns to step S1 to repeat the above-mentioned process steps. Upon determining that the condition has been satisfied (YES in step S8), the CPU 11 ends the game processing.

Figure 9:
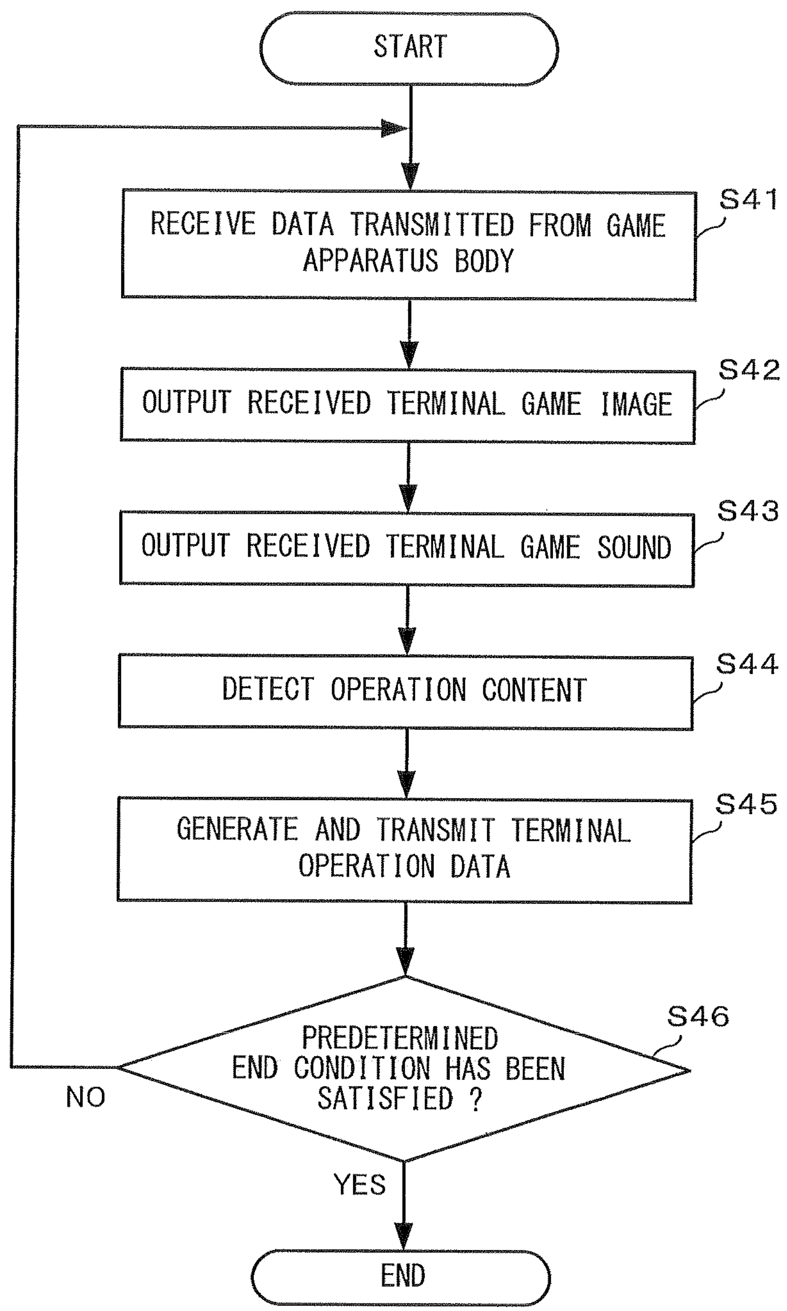
FIG. 9 is a flowchart showing a flow of control processing of the terminal device 6.

Next, an exemplary flow of a control process performed by the control section 33 of the terminal device 6 will be described with reference to the flowchart of FIG. 9. First, in step S41, the control section 33 receives the terminal transmission data 84 transmitted from the game apparatus body 5.

Next, in step S42, the control section 33 outputs, to the LCD 21, a terminal game image included in the received terminal transmission data 84.

Next, in step S43, the control section 33 outputs, to the loudspeakers 23, a sound signal based on data of the terminal game sound included in the received terminal transmission data 84.

Next, in step S44, the control section 33 detects inputs (operation contents) to the operation section 31, the motion sensor 32, and the touch panel 22, and generates operation button data 91 and touch position data 92.

Next, in step S45, the control section 33 generates terminal operation data 83 including the operation button data 91 and the touch position data 92 which have been generated in step S44, and transmits the terminal operation data 83 to the game apparatus body 5.

Next, in step S46, the control section 33 determines whether or not a predetermined condition to end the control process of the terminal device 6 has been satisfied (e.g., whether or not a power-off operation has been performed). Upon determining that the condition has not been satisfied (NO in step S46), the control section 33 returns to step S41 to repeat the above-mentioned process steps. Upon determining that the condition has been satisfied (YES in step S46), the control section 33 ends the control process of the terminal device 6.

As described above, according to the configuration of the exemplary embodiment, the original sound outputted from the loudspeakers 23 and the processed sound outputted from the loudspeakers 2*a* are mixed with each other in the real space, and the mixed sound reaches the player, whereby wider spatial expression is achieved by the sound. For example, the player can hear the game sound with a sense near a reverberation effect that the player can feel when he/she is actually present in a cave.

Further, for example, in the case where the monitor 2 and the terminal device 6 output the same BGM, even if a delay of video/audio output occurs in the monitor 2 depending on the function and/or performance of the monitor 2, a sense of discomfort of the player can be reduced by adding a reverberation effect to the output sound on the monitor side as described above.

The performance of the loudspeakers mounted on the monitor 2 may vary depending on the maker and/or the model type of the monitor 2. Therefore, even when the monitor 2 outputs the original sound of the same BGM, the way the player hears the BGM might vary depending on the model type and/or performance of the monitor that the player uses. Even in such a case, by adding an effect to only the output sound on the monitor side as in the exemplary embodiment, the difference in the way the player hears the sound, which is based on the difference in the performance of the monitor, can be absorbed to some extent. As a result, it is possible to cause the player to hear the sound close to the sound that the creator of the game sound has intended, regardless of the model type and/or performance of the monitor 2 that the player uses. In other words, the creator can create the game sound without much regard for the monitor that the player uses.

In the exemplary embodiment, an exemplary case of reproducing BGM has been described. However, the above-mentioned processing is also applicable to sounds other than BGM, such as sound effects. Further, the above-mentioned processing may be applied to either of BGM and sound effects. That is, as for BGM, the monitor 2 outputs the processed sound thereof, and the terminal device 6 outputs the original sound thereof. On the other hand, as for sound effects, both the monitor 2 and the terminal device 6 may output the original sound thereof. Alternatively, regarding BGM, only some of musical performance parts composing a BGM may be subjected to the above-mentioned processing. For example, when the BGM is composed of three parts, i.e., a melody part, a base part, and a drum part, only the melody part may be subjected to the above-mentioned processing.

Further, in the exemplary embodiment, the case has been described where the series of processes of outputting the original sound of a game sound from the terminal device 6 while outputting, from the monitor 2, the same game sound to which an effect is added are executed on a single apparatus (the game apparatus body 5). However, in another exemplary embodiment, the series of processes may be executed in an information processing system including a plurality of information processing apparatuses. For example, in an information processing system which includes the game apparatus body 5 and a server-side apparatus communicable with the game apparatus body 5 via a network, part of the series of processes may be executed on the server-side apparatus. Further, in the information processing system, the system on the server side may be configured with a plurality of information processing apparatuses, and processes to be executed on the server side may be shared and performed by the plurality of information processing apparatuses.

What is claimed is:

1. A game system including a game apparatus, a first output device having a first display section and a first sound output section, and a second output device having a second display section and a second sound output section, wherein the game apparatus includes a processor system comprising at least one processor, and the processor system being configured to:

generate a first image to be displayed on the first display section, and a second image to be displayed on the second display section; and generate, based on a single set of sound data, a first sound signal to be output to the first sound output section, and a second sound signal to be output to the second sound output section, and a sound signal to which no predetermined acoustic effect is added is generated as the second sound signal, and the first sound signal is generated so as to include a sound signal which is obtained by adding a predetermined acoustic effect to at least a part of the second sound signal.

2. The game system according to claim 1, wherein the first sound signal is generated so as to include a sound to which a reverberation effect is added as the acoustic effect.

3. The game system according to claim 1, wherein an image of a virtual space based on a first virtual camera is generated as the first image, and an image of the virtual space based on a second virtual camera is generated as the second image.

4. The game system according to claim 1, wherein the second output device further includes an operation data generator configured to generate operation data based on an operation performed by a player, and the processor system of the game apparatus is further configured to perform a game process based on the operation data.

5. The game system according to claim 1, wherein the first output device is a monitor device which includes or is connectable to predetermined loudspeakers as the first sound section, and a sound based on the first sound signal is output from the loudspeakers which are included in or connected to the monitor device.

6. The game system according to claim 5, wherein the intensity of the acoustic effect is changed in accordance with a distance from a sound source object in a virtual game space, which is defined as a source of the sound based on the first sound signal and the second sound signal, to a predetermined object or a virtual camera in the virtual game space.

7. The game system according to claim 6, wherein the first sound signal is generated such that the shorter the distance from the sound source object is, the smaller the acoustic effect is.

8. A game apparatus capable of outputting a video/audio signal to a first output device having a first display section and a first sound output section, and to a second output device having a second display section and a second sound output section, the apparatus including:

an image generator configured to generate a first image to be displayed on the first display section, and a second image to be displayed on the second display section; and a sound generator configured to generate, based on a single set of sound data, a first sound signal to be output to the first sound output section, and a second sound signal to be output to the second sound output section, and the sound generator generates, as the second sound signal, a sound signal to which no predetermined acoustic effect is added, and generates the first sound signal so as to include a sound signal which is obtained by adding a predetermined acoustic effect to at least a part of the second sound signal.

9. A non-transitory computer-readable storage medium having stored thereon a game program executed by a computer of a game system including a game apparatus, a first output device having a first display section and a first sound output section, and a second output device having a second display section and a second sound output section, the game program causing the computer to:

generate a first image to be displayed on the first display section, and a second image to be displayed on the second display section; and generate, based on a single set of sound data, a first sound signal to be output to the first sound output section, and a second sound signal to be output to the second sound output section, wherein a sound signal to which no predetermined acoustic effect is added is generated as the second sound signal, and the first sound signal is generated so as to include a sound signal which is obtained by adding a predetermined acoustic effect to at least a part of the second sound signal.

10. A game processing control method of controlling a game system including a game apparatus, a first output device having a first display section and a first sound output section, and a second output device having a second display section and a second sound output section, the method comprising:

an image generation step of generating a first image to be displayed on the first display section, and a second image to be displayed on the second display section; and a sound generation step of generating, based on a single set of sound data, a first sound signal to be output to the first sound output section, and a second sound signal to be output to the second sound output section, wherein in the sound generation step, a sound signal to which no predetermined acoustic effect is added is generated as the second sound signal, and the first sound signal is generated so as to include a sound signal which is obtained by adding a predetermined acoustic effect to at least a part of the second sound signal.

* * * * *